(12) United States Patent
Villa Real et al.

(10) Patent No.: US 10,958,708 B2
(45) Date of Patent: Mar. 23, 2021

(54) CROWDSOURCING BIG DATA TRANSFER

(71) Applicant: International Business Machines Corporation, Armonk, NY (US)

(72) Inventors: Lucas Correia Villa Real, São Paulo (BR); Carlos Henrique Cardonha, São Paulo (BR); Marco Aurelio Stelmar Netto, São Paulo (BR); Priscilla Barreira Avegliano, São Paulo (BR); Vagner Figueredo de Santana, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 16/108,728

(22) Filed: Aug. 22, 2018

(65) Prior Publication Data

US 2020/0068006 A1    Feb. 27, 2020

(51) Int. Cl.
  *H04L 29/08*    (2006.01)
(52) U.S. Cl.
  CPC .......... *H04L 67/06* (2013.01); *H04L 67/1097* (2013.01); *H04L 67/2842* (2013.01)
(58) Field of Classification Search
  CPC .. H04L 67/06; H04L 67/2842; H04L 67/1097
  See application file for complete search history.

(56) References Cited

U.S. PATENT DOCUMENTS

| 5,805,810 A | 9/1998 | Maxwell |
| 6,035,291 A | 3/2000 | Thiel |
| 6,035,307 A | 3/2000 | Martin et al. |
| 6,774,811 B2 | 8/2004 | Kaufman et al. |
| 6,910,628 B1 | 6/2005 | Sehr |

(Continued)

FOREIGN PATENT DOCUMENTS

WO    WO-2019009795 A1 *    1/2019    ......... H04L 67/1097

OTHER PUBLICATIONS

R. A. Gorcitz et al., "Vehicular carriers for big data transfers (Poster)," 2012 IEEE Vehicular Networking Conference (VNC), Seoul, 2012, pp. 109-114, doi: 10.1109/VNC.2012.6407418. (Year: 2012).*

(Continued)

*Primary Examiner* — Nicholas R Taylor
*Assistant Examiner* — Sanjoy Roy
(74) *Attorney, Agent, or Firm* — Joseph Petrokaitis; Otterstedt, Wllace & Kammer, LLP

(57) ABSTRACT

A method for transporting data from a source location to a destination location includes receiving the data from at least one sender at the source location, the sender specifying at least one recipient at the destination location; splitting the data into a plurality of portions; and finding one or more couriers who will travel from the source location to the destination location. The method also includes: while at least a given courier is at the source location, sending at least one of the plurality of portions to a mobile device of at least the given courier; once the given courier travels to the destination location, receiving the at least one of the portions from the mobile device of the given courier; and once the plurality of portions of the data have been received at the destination location, sending the data set to the at least one recipient.

20 Claims, 13 Drawing Sheets

(56) References Cited

U.S. PATENT DOCUMENTS

| | | | |
|---|---|---|---|
| 7,203,753 B2 | 4/2007 | Yeager et al. | |
| 7,567,987 B2 | 7/2009 | Shappell et al. | |
| 7,917,628 B2 | 3/2011 | Hesselink et al. | |
| 8,009,586 B2 | 8/2011 | Chaturvedi et al. | |
| 8,549,165 B2 | 10/2013 | Zhang | |
| 2010/0306267 A1* | 12/2010 | Zamkoff | G06F 11/1456 707/783 |
| 2012/0066517 A1* | 3/2012 | Vysogorets | G06F 21/34 713/193 |
| 2013/0196621 A1 | 8/2013 | Guday et al. | |
| 2015/0026594 A1 | 1/2015 | Dave et al. | |
| 2015/0095197 A1* | 4/2015 | Eramian | G06Q 50/30 705/26.64 |
| 2015/0133152 A1 | 5/2015 | Edge et al. | |
| 2015/0373086 A1* | 12/2015 | Hunt | H04L 61/2596 709/201 |
| 2016/0026180 A1 | 1/2016 | Tsimhoni et al. | |
| 2016/0080486 A1 | 3/2016 | Ram et al. | |
| 2016/0100279 A1* | 4/2016 | Christmas | H04W 4/80 455/41.2 |
| 2016/0212623 A1 | 7/2016 | Cote et al. | |
| 2018/0181904 A1* | 6/2018 | Wilkinson | G06Q 10/083 |
| 2019/0266568 A1* | 8/2019 | O'Brien | G06Q 30/012 |

OTHER PUBLICATIONS

Xu, Performance Modeling of BitTorrent Peer-to-Peer File Sharing Networks, 23 pages, Nov. 5, 2013, https://arxiv.org/pdf/1311.1195.pdf.

Cohen, The BitTorrent Protocol Specification, BitTorrent Enhancement Proposal (BEP) 3, Feb. 4, 2017, http://www.bittorrent.org/beps/bep_0003.html.

Do et al., Crowdsourced Mobile Data Transfer with Delay Bound, ACM Transactions on Internet Technology (TOIT), v. 16. n. 4, Dec. 2016, art. 28 https://dl.acm.org/citation.cfm?id=2939376.

Yu et al., INDAPSON: An Incentive Data Plan Sharing System Based on Self-Organizing Network, IEEE INFOCOM 2014—IEEE Conference on Computer Communications, Apr.-May 2014, p. 1545-1553 http://ieeexplore.ieee.org/document/6848090.

Iosifdis et al., Incentive Mechanisms for User-Provided Networks, IEEE Communications Magazine, v. 52, n. 9, Sep. 2014, p. 20-27 http://ieeexplore.ieee.org/document/6894448.

B. Tierney et al., Efficient data transfer protocols for big data, 2012 IEEE 8th International Conference on E-Science, Oct. 2012, p. 1-9 https://ieeexplore.ieee.org/document/6404462.

Grabr Inc., How Grabr Works | Grabr, 2018, 3 pages, https://grabr.io/en/how-grabr-works.

Amazon Web Services Inc., Data Migration | AWS Snowball, 2018, 3 pages, https://aws.amazon.com/snowball/.

Amazon Web Services Inc., How to Transfer Petabytes of Data Efficiently—AWS Snowball, 2018, 5 pages, https://docs.aws.amazon.com/snowball/latest/ug/transfer-petabytes.html.

Amazon Web Services Inc., Exabyte-scale Data Transfer | AWS Snowmobile, 2018, 2 pages, https://aws.amazon.com/snowmobile/.

Coughlin, Moving Data to the Cloud, Forbes, Jul. 19, 2017, 2 pages, https://www.forbes.com/sites/tomcoughlin/2017/07/19/moving-data-to-the-cloud/.

Chong, Google Cloud Platform Blog: Introducing Transfer Appliance: Sneakernet for the cloud era, Jul. 28, 2017, 6 pages, https://cloudplatform.googleblog.com/2017/07/introducing-Transfer-Appliance-Sneakemet-for-the-cloud-era.html.

Google Inc., Data Transfer Appliance | Offline Data Migration | Google Cloud, 2017, 3 pages, https://cloud.google.com/transfer-appliance/.

Google Inc., Offline Media Import / Export | Cloud Storage Documentation | Google Cloud, Jul. 10, 2018, 2 pages, https://cloud.google.com/storage/docs/offline-media-import-export.

Fork, Introducing a Fast, Simple Way to Transport Data to the IBM Cloud—Think Blog, Sep. 18, 2017, 1 page, https://www.ibm.com/blogs/think/2017/09/ibm-cloud-mdm/.

IBM Corp., IBM Cloud Mass Data Migration Overview, Jun. 27, 2018, 2 pages, https://console.bluemix.net/docs/infrastructure/mass-data-migration/overview.html.

IBM Corp., IBM Cloud Mass Data Migration FAQs, Jul. 2, 2018, 4 pages, https://console.bluemix.net/docs/infrastructure/mass-data-migration/mass-data-migration-faqs.html.

IBM Corp., IBM Managed File Transfer Suite, May 2015, 4 pages, https://public.dhe.ibm.com/common/ssi/ecm/zz/en/zzs03049usen/non-bu-specific-industry-solutions-software-zz-solution-brief-zzs03049usen-20180502.pdf.

IBM Corp., IBM News room—Jan. 17, 2014 IBM Closes Acquisition of Aspera—United States, Jan. 17, 2014, 1 page, https://www-03.ibm.com/press/us/en/pressrelease/42965.wss.

IBM Corp., Aspera FASP high-speed transport, IBM Cloud Technical Whitepaper, Dec. 2016, https://public.dhe.ibm.com/common/ssi/ecm/ku/en/kuw12449usen/cloud-cloud-platform-ku-technical-white-paper-kuw12449usen-20180102.pdf.

Wikipedia, Sneakernet, Jul. 10, 2018, 7 pages, https://en.wikipedia.org/wiki/Sneakernet.

Schwartz, Moving a Petabyte of Data | What I Couldn't Say . . . , Mar. 12, 2007, 2 pages, https://jonathanischwartz.wordpress.com/2007/03/12/moving-a-petabyte-of-data/.

Patterson, A Conversation with Jim Gray, ACM Queue, v. 1, n. 4, Jul. 2003, p. 8-17, http://delivery.acm.org/10.1145/870000/864078/interview.pdf.

Waters, Google helps terabyte data swaps, BBC News, Mar. 7, 2007, 3 pages, http://news.bbc.co.uk/2/hi/technology/6425975.stm.

Farivar, Google's Next-Gen of Sneakernet, WIRED, Mar. 20, 2007, 4 pages, https://www.wired.com/2007/03/googles-next-gen-of-sneakernet/.

Hui, Computer Laboratory—Haggle, University of Cambridge, Mar. 1, 2006, 3 pages, http://www.cl.cam.ac.uk/research/srg/netos/haggle/.

Waitzman, A Standard for the Transmission of IP Datagrams on Avian Carriers, IETF RFC 1149, Apr. 1, 1990, 2 pages, https://tools.ietf.org/pdf/rfc1149.pdf.

Waitzman, IP over Avian Carriers with Quality of Service, IETF RFC 2549, Apr. 1, 1999, 6 pages, https://tools.ietf.org/pdf/rfc2549.pdf.

Carpenter et al., Adaptation of RFC 1149 for IPv6, IETF RFC 6214, Apr. 1, 2011, 7 pages, https://tools.ietf.org/pdf/rfc6214.pdf.

* cited by examiner

CROWDSOURCING BIG DATA TRANSFER

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic and computer arts, and, more particularly, to improvements in data transmission.

BACKGROUND OF THE INVENTION

Transmitting large volumes of data is essential in many industries, but remains problematic. Transmission relying on information technology (IT) infrastructure is usually easier, but bandwidth consumption requirements may make it infeasible (e.g., too expensive or even physically impossible). More traditional means of transportation (e.g., post) avoid such issues, but the whole process is more cumbersome: the user typically needs to copy the data to an external storage device, bring it to a post office, pay any fees to ship it, get a tracking number, and continuously keep track of the package herself (and then the reverse process applies at the receiver side). Traditional transportation means may have issues with security/privacy or issues involving the proper delivery, such that the logistic operations need to be executed by reliable individuals.

SUMMARY OF THE INVENTION

Aspects of the invention include apparatus and methods for transporting a set of data from a source location to a destination location. The destination location being geographically remote from the source location.

A first method includes receiving the data set from at least one sender at the source location, the sender specifying at least one recipient at the destination location; splitting the data set into a plurality of portions; and finding one or more couriers who will travel from the source location to the destination location. The first method also includes while at least a given courier is at the source location, sending at least one of the plurality of portions to a mobile device of at least the given courier; once the given courier travels to the destination location, receiving the at least one of the portions from the mobile device of the given courier; and once the plurality of portions of the data set have been received at the destination location, sending the data set to the at least one recipient specified by the sender.

A second method includes a mobile device receiving and displaying a request to transport at least a portion of a set of data from a source location to a destination location; after a user of the mobile device agrees to the request, downloading at least the portion of the data set onto the mobile device at the source location; transporting the mobile device from the source location to the destination location; and after arriving at the destination location, uploading at least the portion of the data set from the mobile device at the destination location.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Illustrative embodiments of the present invention include a system and methods for hybrid physical and digital data transfer that enable transmission of large volumes of data. Thus, illustrative embodiments advantageously reduce data transfer time, avoid traffic overload in the network, reduce risk of data loss (e.g., due to data corruption and/or hardware failure), and reduce data transmission costs.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
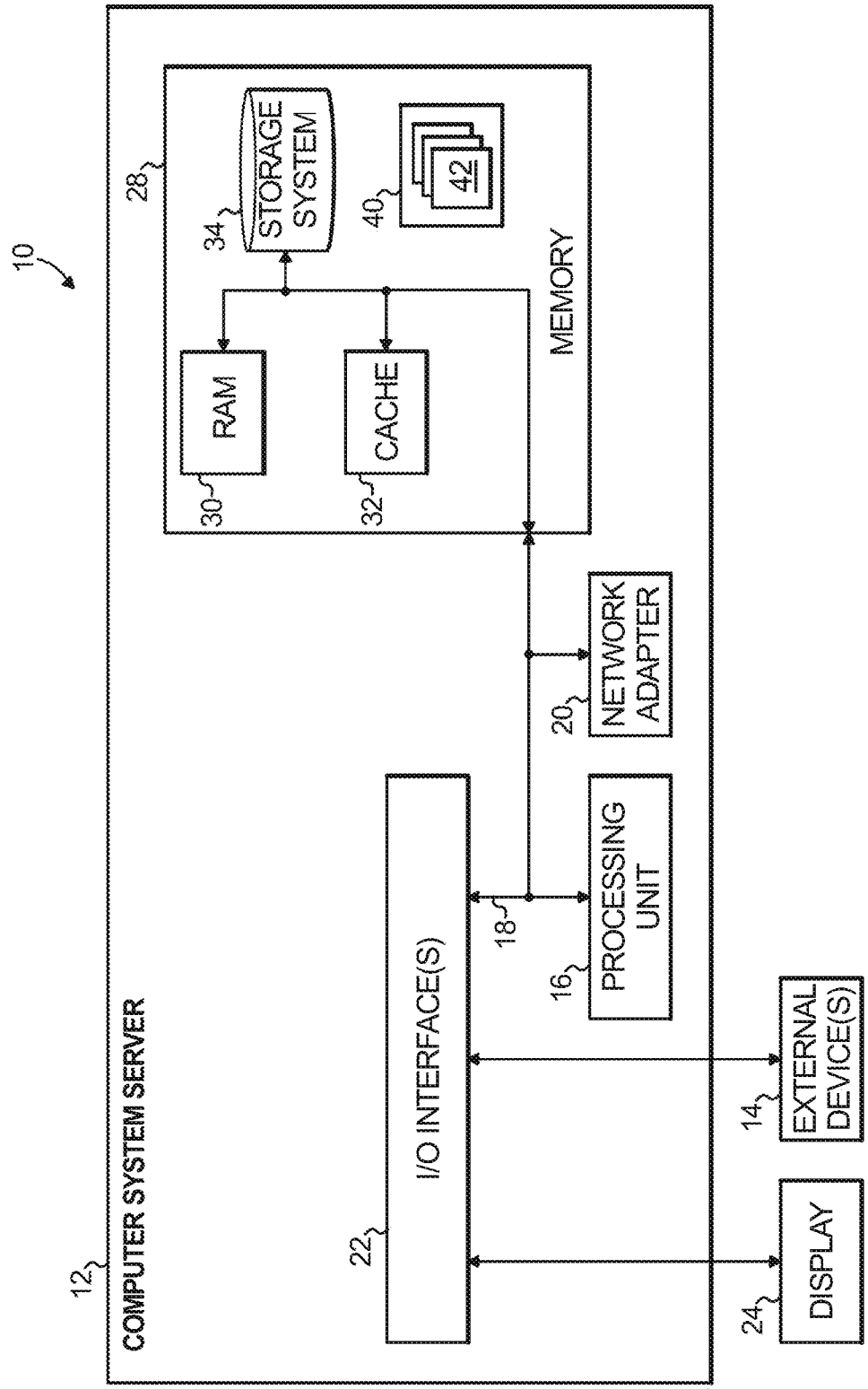
FIG. 1 depicts a cloud computing node according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
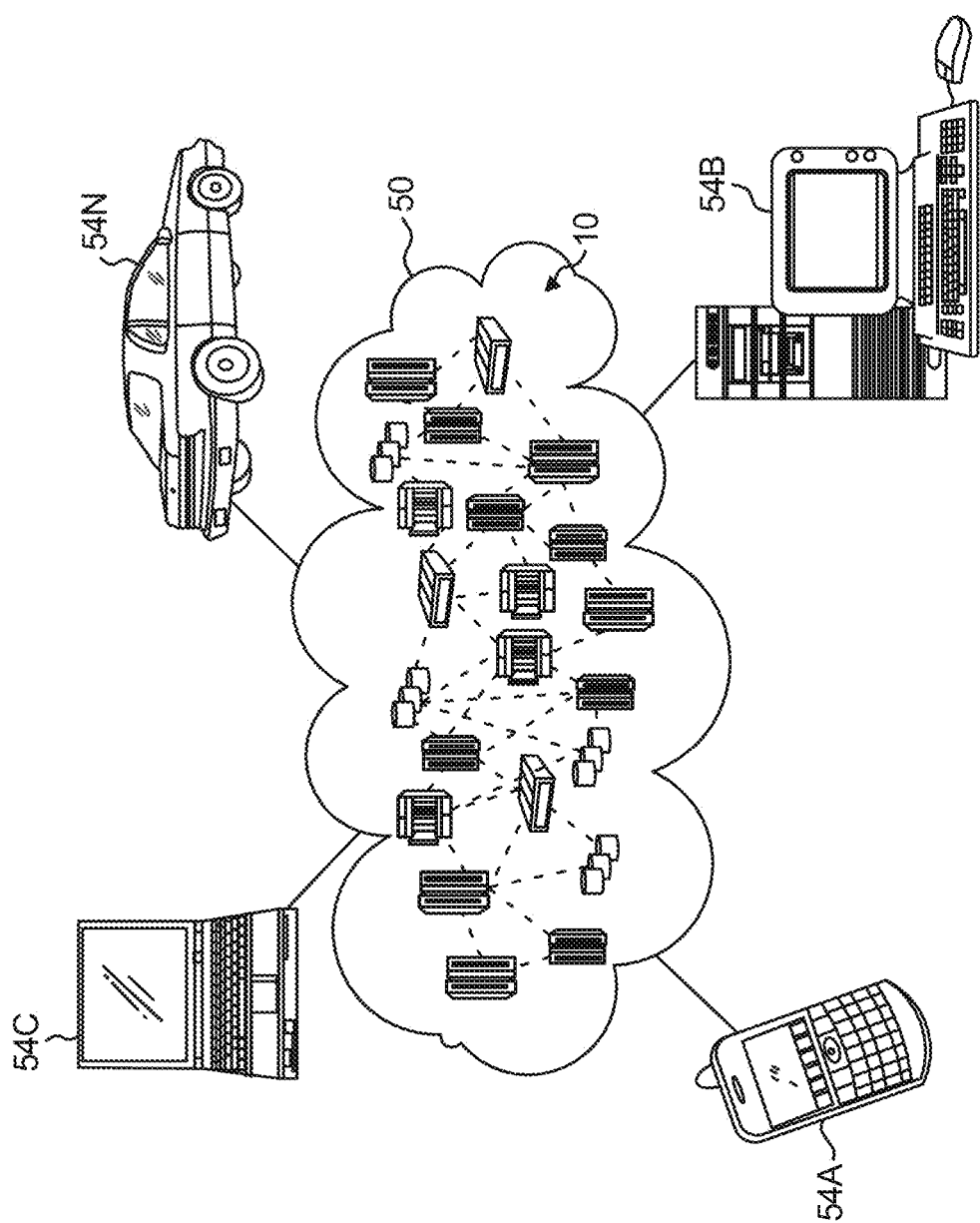
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
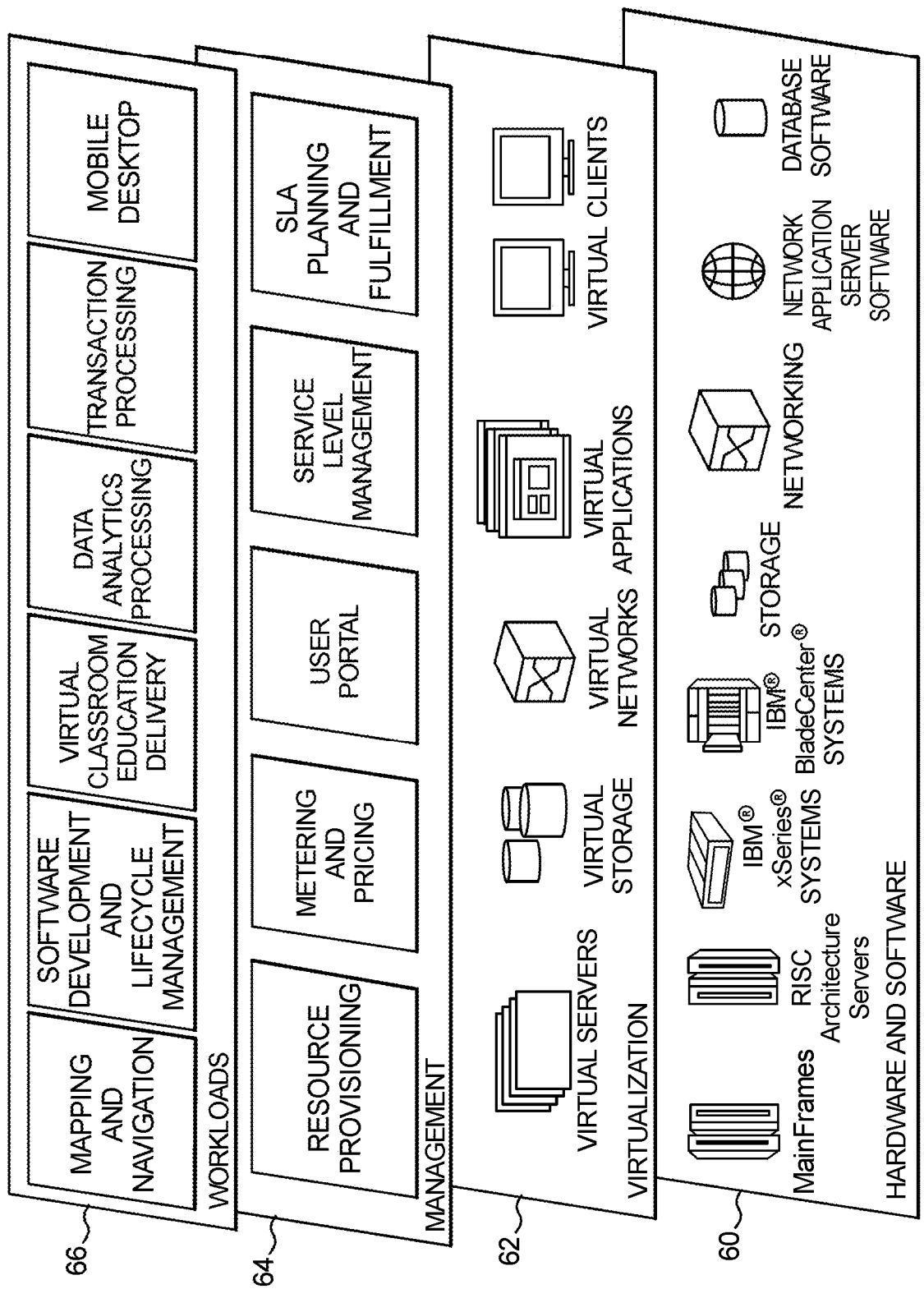
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Illustrative embodiments of the present invention include a system and methods for hybrid physical and digital data transfer that enable transmission of large volumes of data. Illustrative embodiments advantageously provide data distributed shipping by leveraging traditional transportation services (e.g., postal data transmission) as opportunistic networks for private peer-to-peer data transfer. Illustrative embodiments may include crowdsourcing data transfer with incentive mechanisms for human carriers. In an illustrative embodiment, a data transfer service such as Aspera® could partner with logistic companies (e.g., airlines and/or railroads) in order to request services from their passengers as data couriers for the transmission process. (Aspera is a registered trademark of International Business Machines Corporation). Illustrative embodiments advantageously reduce data transfer time, avoid traffic overload in the network, reduce risk of data loss (e.g., due to data corruption and/or hardware failure), and reduce data transmission costs.

Figure 4:
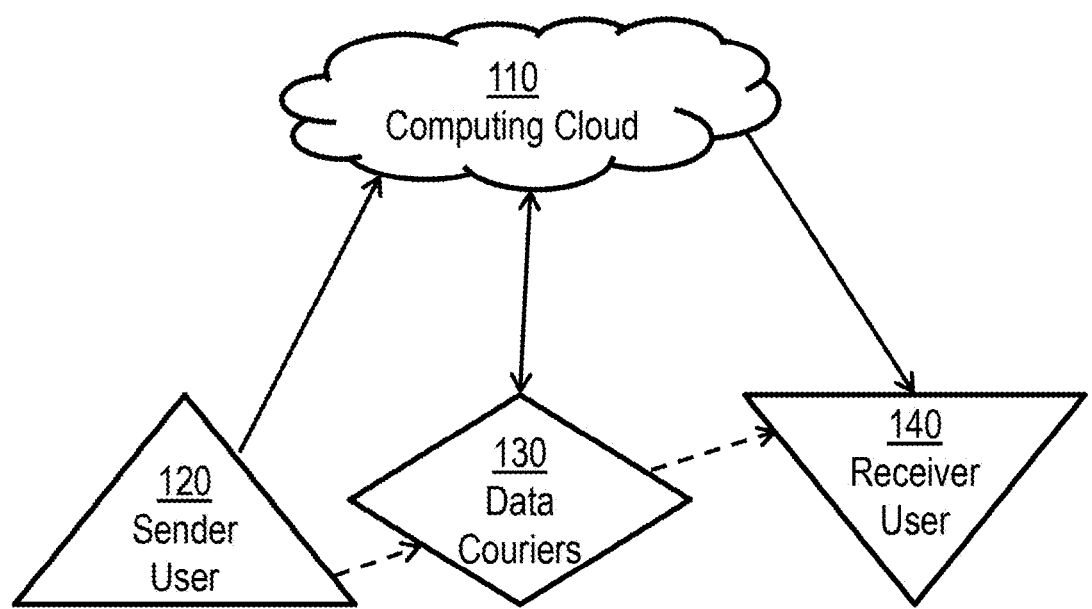
FIG. 4 is a block/flow diagram depicting an exemplary infrastructure according to an illustrative embodiment of the present invention.

FIG. 4 is a block/flow diagram depicting an exemplary infrastructure according to an illustrative embodiment of the present invention. In an illustrative embodiment, sender user(s) 120 may want to transfer a set of data (e.g., one or more data files) to receiver user(s) 140. A sender user 120 is a person (or digital entity) who wants to send data to another person (or digital entity), and a receiver user 140 is a person (or digital entity) who wants to receive data from another person (or digital entity). The data to be transferred may include any digital content, such as text file(s), image(s), or video(s).

Although embodiments herein will be described primarily with a single sender user 120 and a single receiver user 140, it is to be understood that principles of the present invention may be applied to multiple sender users 120 and/or multiple receiver users 140. Sender user 120 and receiver user 140 may geographically distant from each other, entailing transcontinental and/or transoceanic data transfer: for example, sender user 120 may be in Sao Paulo, Brazil, while receiver user 140 may be in Lisbon, Portugal.

Sender user 120 may sync the data set with a computing cloud 110, which may be similar to those discussed above, via a client app. The client app is software executed, e.g., on a mobile computing device and/or a server (e.g., 10 in FIG. 1), that interacts with the crowd-based data transfer manager 200. The computing cloud 110 may include computing infrastructure (e.g., at least one processing unit, e.g., 16 shown in FIG. 1) that runs a crowd-based data transfer manager (e.g., 200 shown in FIG. 7), which may be a software service responsible for using a crowd (e.g., data couriers 130) to transfer data from one place (e.g., sender user 120) to another place (e.g., receiver user 140) using at least in part a physical transfer device (such as an airplane, ship, train, car, truck, and/or motorcycle).

The computing cloud 110 may then distribute at least a portion of the data among one or more data couriers 130 (e.g., syncing through respective client apps), who are users who are currently geographically proximate to the sender user 120 but will soon travel to the vicinity of the receiver user 140. (As used herein, the phrase "data carrier" shall be synonymous with "data courier"). With reference to the above example, the data couriers 130 may be one or more passengers scheduled to fly from Sao Paulo, Brazil to Lisbon, Portugal. Although data couriers 130 are preferably people who are already planning to travel from the source to the destination for other reasons (e.g., vacation), they could also include people who book travel solely for the purpose of data transportation, e.g., upon being offered a financial reward. Once the data couriers 130 travel to the vicinity of the receiver user 140 (e.g., arrive in Lisbon), the data couriers 130 may transfer the data to the receiver user 140 (e.g., syncing via a client app) via the computing cloud 110. It may desirable to use multiple data couriers to transfer a given subset of data in order to provide redundancy and prevent data corruption and/or loss.

In addition to the physical transfer of data by data couriers 130, at least a portion of the data may be transferred in the computing cloud 110 directly from sender user 120 to receiver user 140 via digital data transfer over one or more computer network(s), such as the Internet. For example, it may desirable to transfer a given subset of data digitally via a computer network as well as physically via one or more data couriers in order to provide redundancy and prevent data corruption and/or loss.

Thus, sender user 120 loads data into a system (e.g., 110 in FIG. 4 and/or 200 in FIG. 7), which then sends the loaded data to a destination (e.g., receiver user 140) using a crowd of data couriers (e.g., 130) that transfer part of the data in exchange for a reward. An illustrative embodiment may include a client app for data couriers 130 that controls data courier profile data, downloads a small part of the loaded data at the origin (e.g., before traveling), and uploads that small part of the loaded data at the destination (e.g., after traveling).

Figure 5A:
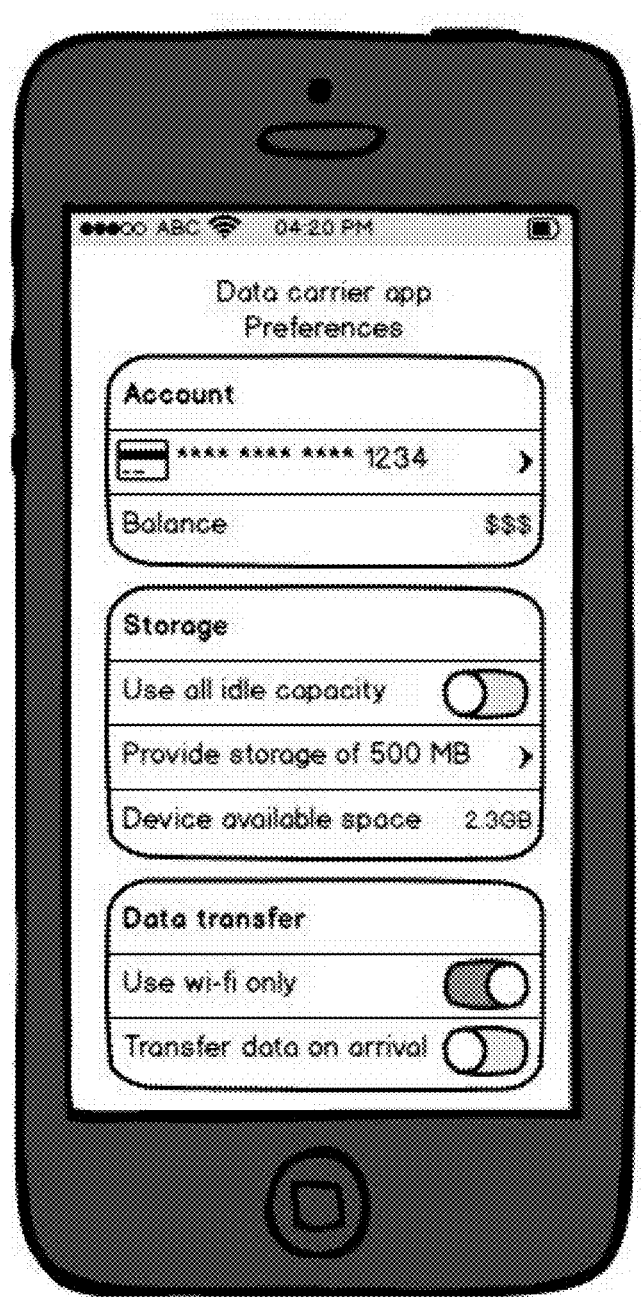
FIGS. 5A-5D depict aspects of a user interface which may be displayed on a mobile computing device of a data courier before traveling for data transportation.

FIGS. 5A-5D depict exemplary user interfaces displayed on a mobile computing device of a data courier 130 before traveling for data transportation. This mobile computing device may be, for example, a smart phone, a tablet, a portable computer, and/or a digital camera, and may be similar to system 12 described above with reference to FIG. 1. FIG. 5A depicts an exemplary profile displayed on a user interface to a data courier 130 before traveling according to an illustrative embodiment of the present invention. The data courier 130 can select account preferences, such as specifying a bank account or payment card to which payments should be made, for which an account balance may be shown. The data courier 130 can also select storage preferences: the device available space is shown, and the data courier 130 can select whether to use all idle capacity, or instead to provide storage of a specified quantity, such as 500 megabytes (MB). The data courier 130 can select data transfer preferences, such as whether to use Wi-Fi® only (e.g., according to an IEEE® 802.11 standard) rather than cellular data (e.g., according to a GSM and/or CDMA standard), for example, to avoid use of a limited data allowance or roaming charges imposed by a mobile carrier. (Wi-Fi is a registered trademark of Wi-Fi Alliance, and IEEE is a registered trademark of Institute of Electrical and Electronics Engineers, Inc.). The data courier 130 can also select whether to automatically transfer data immediately upon arrival rather than waiting for the data courier 130 to approve data transfer (e.g., once the data courier 130 has left the airport and checked into a hotel).

Figure 5B:
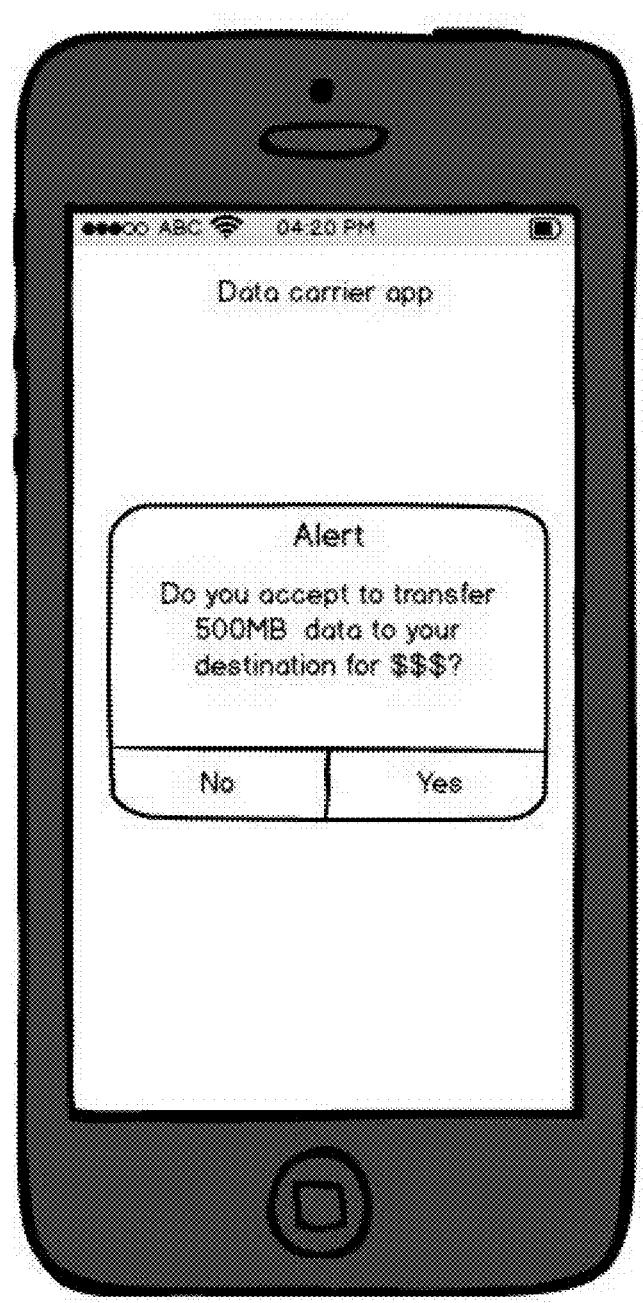

FIG. 5B depicts an exemplary alert displayed on a user interface to a data courier 130 before traveling according to an illustrative embodiment of the present invention. The data courier 130 is asked to agree to transfer a specified amount of data (e.g., 500 MB) from a current location (e.g., proximate to sender user 120) to a destination (e.g., proximate to receiver user 140) in return for a specified monetary reward. This screen would typically be shown after a trip to a destination at a specified time has been booked, and usually shortly before (e.g., the evening before and/or the morning of) the departure. However, this screen could also be shown to a data courier 130 who is not already planning to travel to the destination, but who may be willing to travel if offered a sufficient financial reward for data transportation.

Figure 5C:
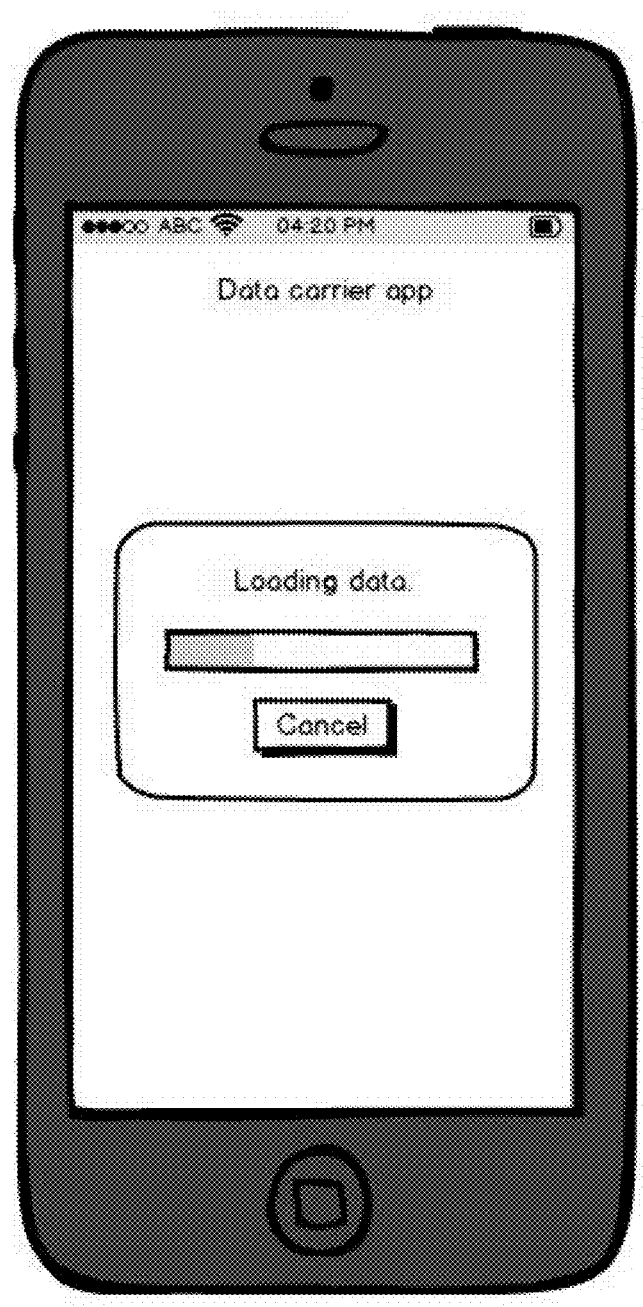
Figure 5D:
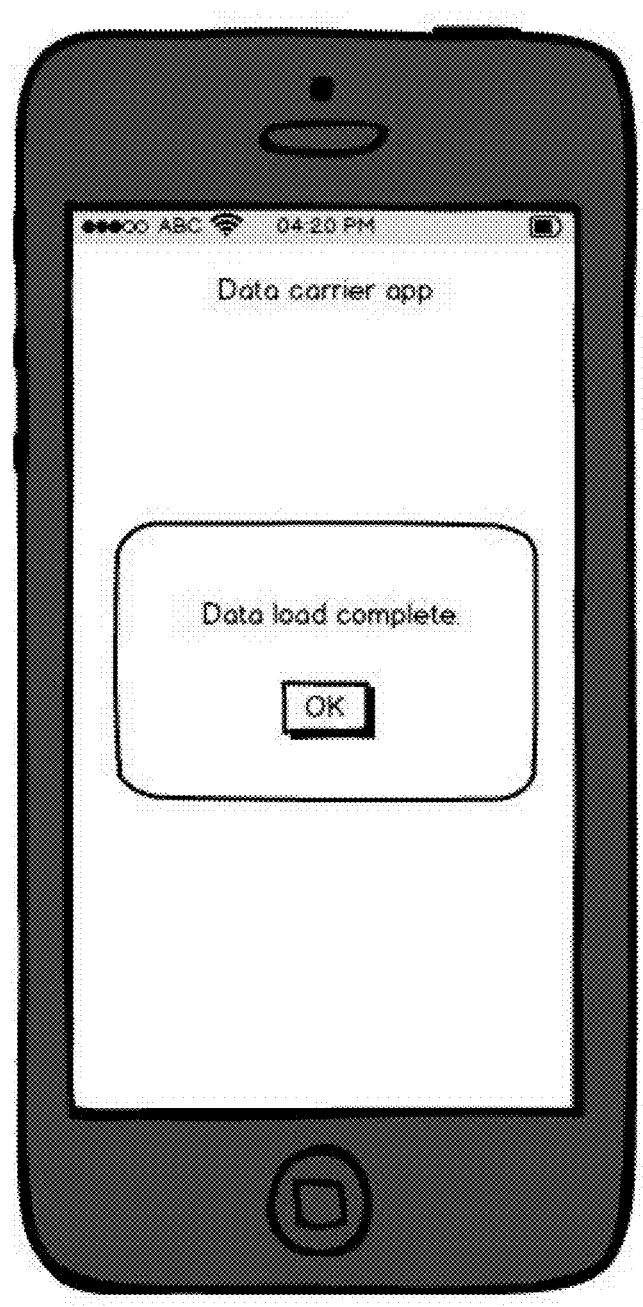

FIG. 5C depicts an exemplary acceptance displayed on a user interface to a data courier 130 before traveling according to an illustrative embodiment of the present invention. As shown in FIG. 5C, after the data courier 130 accepts the transfer in FIG. 5B, the data (e.g., the agreed-to 500 MB) is downloaded from the cloud 110 onto, and stored on, the mobile computing device which the data courier 130 will transfer to the destination. FIG. 5D depicts an exemplary completion displayed on a user interface to a data courier 130 before traveling according to an illustrative embodiment of the present invention. As shown in FIG. 5D, the data load shown in FIG. 5C has completed, and the mobile computing device is ready to be transported by the data courier 130 to the destination.

Figure 6A:
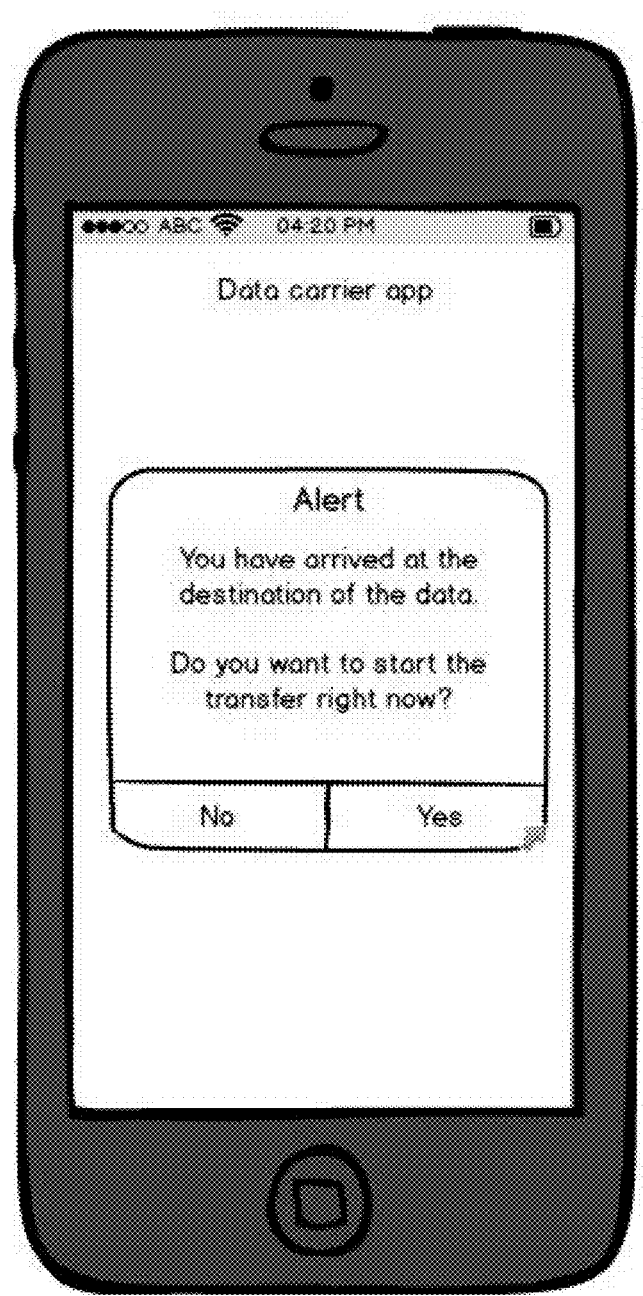
FIGS. 6A-6C depict aspects of a user interface which may be displayed on a mobile computing device of a data courier after traveling for data transportation.
Figure 6B:
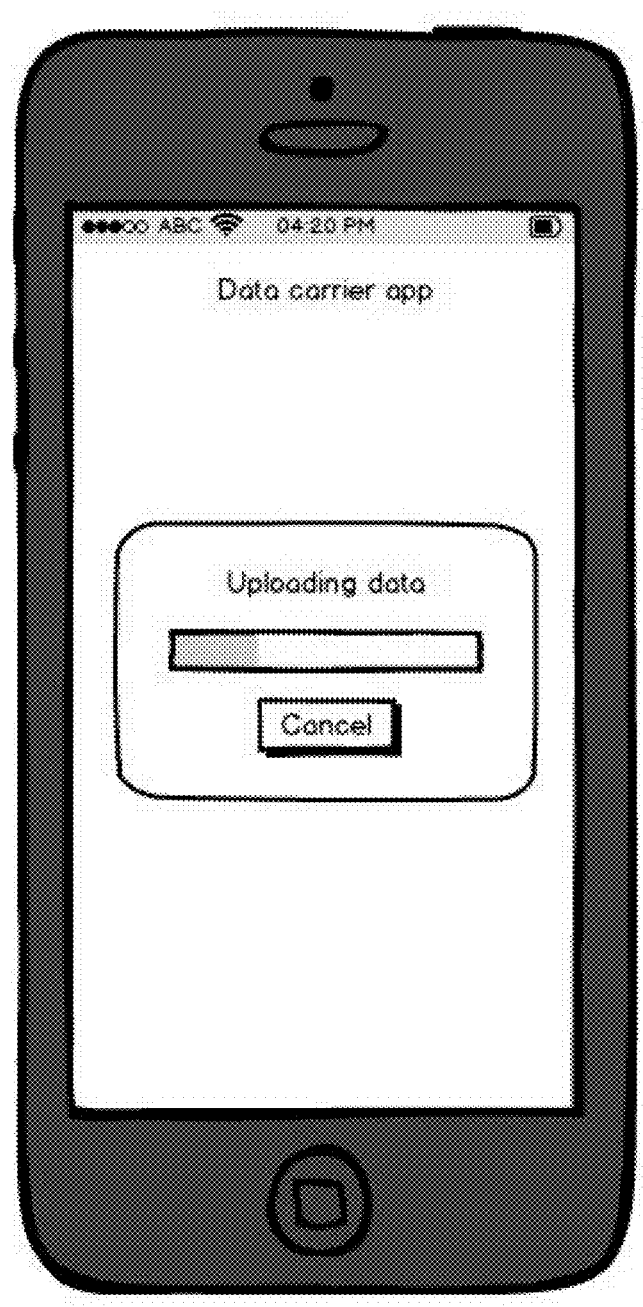
Figure 6C:

FIGS. 6A-6C depict exemplary user interfaces displayed on a mobile computing device of a data courier 130 after traveling for data transportation. FIG. 6A depicts an exemplary arrival notice displayed on a user interface to a data courier 130 after traveling according to an illustrative embodiment of the present invention. The data courier 130 is notified of her arrival at the destination of the data, and the data courier 130 is asked whether to start the transfer (e.g., upload) right now. In some cases, the data courier 130 may wish to defer the transfer until leaving the airport and checking into a hotel, which may offer a more stable Wi-Fi® connection. FIG. 6B depicts an exemplary upload displayed on a user interface to a data courier 130 after traveling according to an illustrative embodiment of the present invention. As shown in FIG. 6B, after the data courier 130 accepts the transfer in FIG. 6A, the data (e.g., the agreed-to 500 MB) is uploaded from the mobile computing device to the cloud 110, where it may then be provided to receiver user 140. FIG. 6C depicts an exemplary reward displayed on a user interface to a data courier 130 after traveling according to an illustrative embodiment of the present invention. After the upload in FIG. 6B is complete, a monetary reward is sent to the account specified by the data courier 130 in FIG. 5A.

Figure 7:
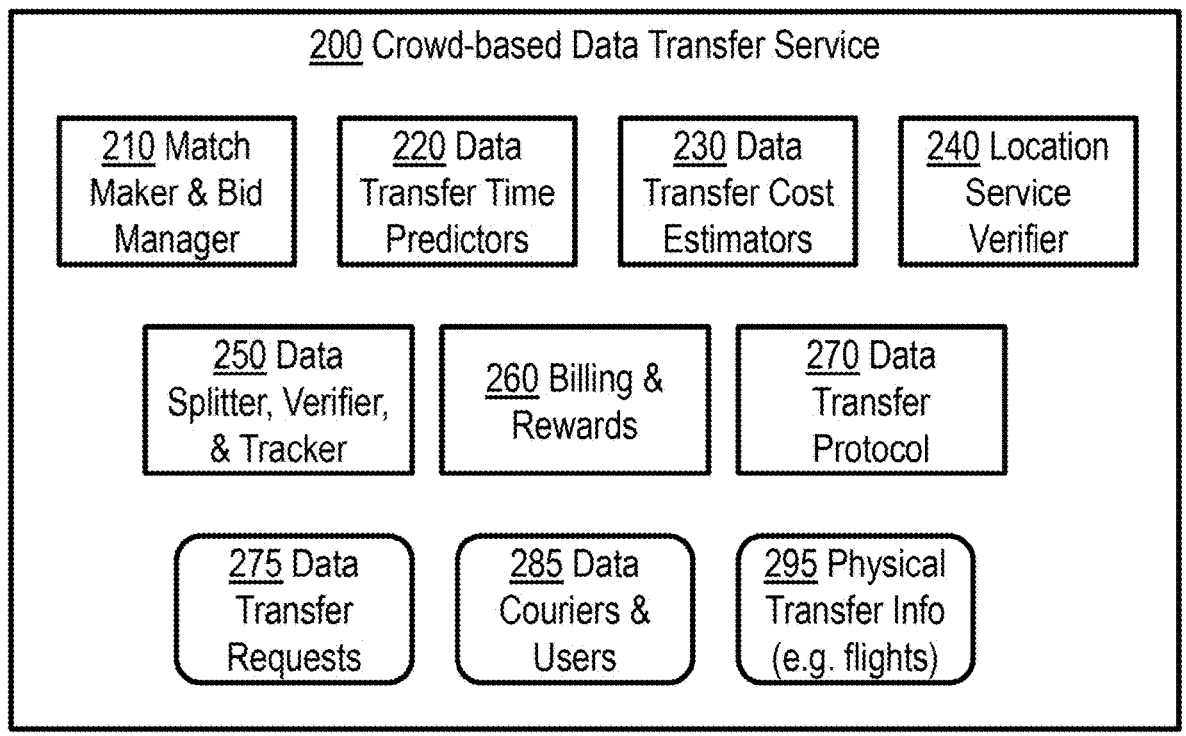
FIG. 7 is a block diagram depicting an exemplary architecture according to an illustrative embodiment of the present invention.

FIG. 7 is a block diagram depicting an exemplary architecture according to an illustrative embodiment of the present invention. FIG. 7 depicts components (e.g., modules) within a crowd-based data-transfer service 200 according to an illustrative embodiment of the present invention. Each of the components shown in FIG. 7 may be implemented using hardware, software, or a combination thereof. By way of example, crowd-based data-transfer service 200 may be implemented as a program (e.g., 40 in FIG. 1) on a server node (e.g., 10 in FIG. 1) within a computing cloud (e.g., 110 in FIG. 4), with the remaining components shown in FIG. 7 implemented as respective modules (e.g., 42 in FIG. 1). However, crowd-based data-transfer service 200 may be implemented on a processing unit (e.g., 16 in FIG. 1) of a computing system (e.g., 12 in FIG. 1) which is internal or external to the service location (e.g., on-premises or in the cloud 110).

Data transfer requests database 275 stores requests by sender users 120 to transfer data. Data couriers and users database 285 stores accounts of data couriers 130, sender users 120, and receiver users 140. Physical transfer information database 295 stores information on how data couriers 130 are or will be moving from one place to another (e.g., flights on which data couriers 130 are booked). This information may be obtained from transportation companies, such as airlines or travel agencies.

Match maker and bid manager 210 matches data couriers 130 to requested data transfers, e.g., mapping data couriers' travel plans and compensation to the demands of other users (e.g., sender 120 and receiver 140). Match maker and bid manager 210 may select potential data couriers to be part of a data transfer based on their trajectories, bandwidth, and storage capabilities. Match maker and bid manager 210 may also send data transfer requests to the selected data couriers informing them (e.g., as shown in FIG. 5B) of the destination of the data to be transferred, the size of the file, and the award to be received once the transfer is concluded.

Data transfer time predictors 220 predicts the time required to transfer data physically using data couriers 130 and/or digitally using computer networks (e.g., the Internet). As previously noted, embodiments may involve transferring data (e.g., a given portion and/or respective separate portions) both physically using data couriers 130 and digitally using computer networks.

Data transfer cost estimators 230 predicts monetary costs to transfer the data physically and/or digitally. For digital transfer using computer networks, the cost estimate can be based on contracts (on package plans) with an Internet service provider. For crowd-based physical transfer using data couriers, the cost estimate can be based on previous similar bids. Thus, data transfer cost estimators 230 may compute economic viability for data carrier awards given the sender payment, transfer prices, and estimated time of arrival of all of the data.

Location service verifier 240 determines when data can be pushed (downloaded) or pulled (uploaded) based on location of data couriers 130, which can be determined using global positioning system (GPS). Billing and rewards module 260 manages billing (e.g., to sender user 120 and/or receiver user 140) and rewards (e.g., to data couriers 130).

Data splitter, verifier, and tracker 250 determines how to split the data uploaded by the sender 120 into smaller parts for multiple data carriers, verifies the consistency of data, and tracks data during transmissions. Data transfer protocol 290 determines the size of the packets to be transferred, compresses and/or encrypts the data payload, and performs packet routing based on network congestion. Data transfer protocol 290 is also used by the receiver user 140 to acknowledge the receipt of data transfers.

An exemplary algorithm to split the file in various pieces and distribute to various devices can be based on those described in, e.g., BitTorrent® Enhancement Proposal (BEP) 3, and Kunjie Xu, "Performance Modeling of BitTorrent Peer-to-Peer File Sharing Networks", both of which are hereby incorporated by reference herein. (BitTorrent is a registered trademark of BitTorrent, Inc.) Write and read operations for the data can optionally be tracked using blockchain. Using blockchain can facilitate auditing which devices (e.g., data couriers 130) handled the different pieces of the files being transferred from source (e.g., sender user 120) to destination (e.g., receiver user 140).

Figure 8:
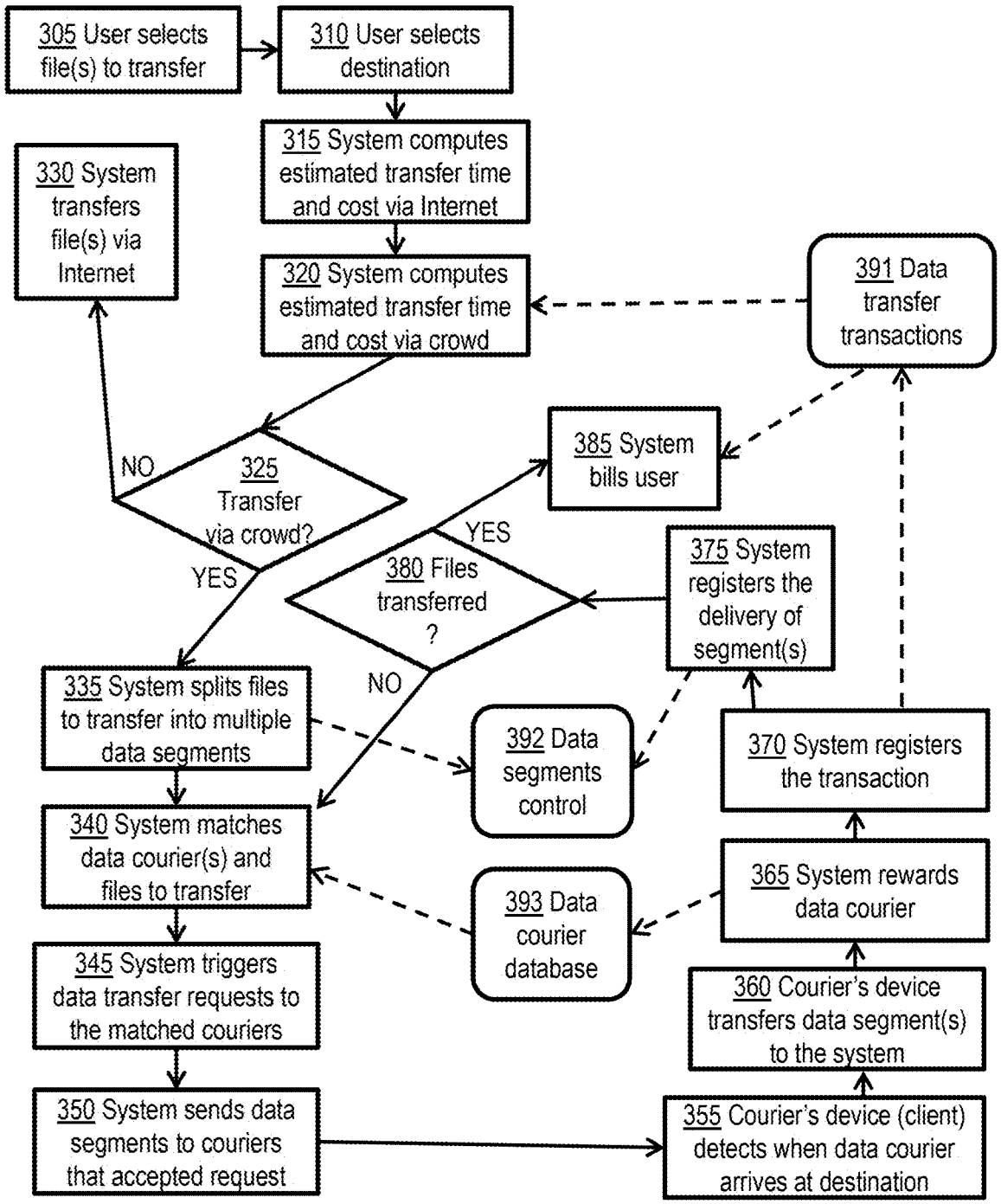
FIG. 8 is a flow chart depicting an exemplary technique according to an illustrative embodiment of the present invention.

FIG. 8 is a flow chart depicting an exemplary technique according to an illustrative embodiment of the present invention. In step 305, a sender user 120 selects which file(s) and/or folder(s) should be transmitted, e.g., through a user interface similar to Aspera®. After selecting the files in step 305, the sender user 120 selects the destination in step 310, which could be a server (e.g., 12 in FIG. 1) located in a specific city, preferably geographically proximate to the receiver user 140. In step 310, the user may also select a maximum budget and/or a due date for the transfer.

In step 315, the system (e.g., 200 in FIG. 7) estimates the expected transfer time and cost for network (e.g., digital) data transfer based on, e.g., the volume of the files or the current network traffic. In step 320, the system estimates the expected transfer time and cost for crowd-sourced (e.g., physical) data transfer based on, e.g., historic data about availability of, and rates charged by, data couriers 130. Step 320 may consider data transfer instructions database 391, which may be similar to data transfer requests database 275 discussed above with reference to FIG. 7. More generally, steps 315 and 320 may involve data transfer time predictors 230 and data transfer cost estimators 240 discussed above with reference to FIG. 7.

In step 325, the user may choose between network data transfer and crowd-sourced data transfer based on the time and cost estimates in steps 315 and 320. Although FIG. 8 shows an exclusive choice, as previously discussed, some embodiments may use a hybrid of physical (crowd-sourced) data transfer and digital (network) data transfer. If the user chooses not to use crowd-sourced data transfer in step 325, the system transfers files via computers networks, such as the Internet, in step 330.

If the user chooses to use crowd-sourced data transfer in step 325, the system splits the files into smaller parts (i.e., multiple data segments) in step 335. To enhance privacy, these parts may be encrypted and/or divided in a manner that prevents them from being interpreted until the transfer is complete. Moreover, to enhance reliability, these segments may include partial and/or complete redundancy, such that a given part of a file may be included in two segments, which may include additional parts such that the segments may include different sets of parts (e.g., in a manner similar to striping). Step 335 may include writing to data segments control database 392. Step 335 may be performed, for example, by data splitter, verifier, and tracker module 250 and/or data transfer protocol module 290 described above with reference to FIG. 7.

In step 340, the system assigns parts of the files to data courier(s) 130, e.g., based on trajectories and storage availability. Step 340 may include reading from data courier database 393, which may contain information about storage availability, itinerary, and transference fee. Data courier database 393 may correspond to data couriers and users database 285 and/or physical transfer information database 295 discussed above with reference to FIG. 7. Step 340 may be performed, for example, by match maker and bid manager module 210 described above with reference to FIG. 7.

In step 345, the system requests data transfer services from potential data couriers, and optionally may indicate a due date for the data transfer service. Step 345 may include displaying a screen similar to that shown in FIG. 5B on a mobile computing device of a data courier 130. In step 350, the system starts data transmission to devices of carriers that accepted the data transfer service, e.g., using data transfer protocol 290 discussed above with reference to FIG. 7. Step 350 may include displaying screens similar to those shown in FIGS. 5C and/or 5D on a mobile computing device of a data courier 130. Location service verifier 240, discussed above with reference to FIG. 7, may be utilized in connection with steps 345 and/or 350.

After step 350, the data courier 130 travels from her current location to the destination (e.g., via airplane, train, car, bus, etc.) In step 355, the client app on the data courier's mobile computing device detects when data courier 130 arrives at the destination. For example, the data courier's client app may periodically monitor location (e.g., using GPS) to verify whether the destination has been reached. Step 355 may involve displaying a screen similar to that shown in FIG. 6A on a mobile computing device of a data courier 130.

Step 360 involves transferring data from the mobile computing device of the data courier 130 to a server of the receiver user 140 via the Internet and/or computing cloud 110, e.g., using data transfer protocol 290 discussed above with reference to FIG. 7. Step 360 may involve displaying a screen similar to that shown in FIG. 6B on a mobile computing device of a data courier 130. Location service verifier 240, discussed above with reference to FIG. 7, may be utilized in connection with steps 355 and/or 360.

Step 365 involves verifying whether the data courier 130 has completed her agreed-upon data transfer service and, if so, delivering the promised reward. Step 365 may including writing to data courier database 393. Step 365 may be performed, for example, by billing and rewards module 260 described above with reference to FIG. 7. Step 365 may involve displaying a screen similar to that shown in FIG. 6C on a mobile computing device of a data courier 130.

In step 375, the system registers the transaction and saves the costs in the data transfer transactions database 391. In step 380, the system registers the completion of the data transmission process for the particular piece of data, which may include writing to the data segments control database 392. Step 380 checks to see if all parts of the file(s) have been transferred. If any file part has not been transferred, the process returns to step 340 and the part is sent back to the pending list. If all file parts have been transmitted, the process ends in step 385 with the system billing the sender user 120 and/or the receiver user 140. Step 385 may including writing to data transfer transactions 393. Step 385 may be performed, for example, by billing and rewards module 260 described above with reference to FIG. 7.

One example of user interface to implement user interface aspects of an illustrative embodiment of the present invention is shown in FIGS. 5A-5D and 6A-6C. FIGS. 5A-5D depict aspects of a user interface which may be displayed on a computing device (e.g., personal computer and/or smart phone) of a data courier user before traveling for data transportation, while FIGS. 6A-6C depict aspects of a user interface which may be displayed on a computing device of a data courier after traveling for data transportation. Such a user interface can be implemented, for example, via hypertext markup language (HTML) code served out by a server or the like, to a browser of a computing device of a user. The HTML is parsed by the browser on the user's computing device to create a graphical user interface (GUI). Any number of techniques for generating web pages may be used.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks in the figures. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for transporting a set of data from a source location to a destination location, the destination location being geographically remote from the source location, the method comprising:
    receiving the data set from at least one sender at the source location, the sender specifying at least one recipient at the destination location;
    receiving a user selection of a maximum budget and a due date for transporting the set of data;
    splitting the data set into a plurality of portions;
    finding, by analyzing travel information from a transportation provider, two or more couriers who will travel from the source location to the destination location to each carry at least one of the plurality of portions based on the maximum budget and the due date;
    while at least a given courier is at the source location, sending at least one of the plurality of portions to a mobile device of at least the given courier;
    once the given courier travels to the destination location, receiving the at least one of the portions from the mobile device of the given courier;
    once the plurality of portions of the data set have been received at the destination location, sending the data set to the at least one recipient specified by the sender.

2. The method of claim 1, wherein finding the two or more couriers comprises offering a reward to each courier for transporting at least one of the plurality of portions of the data set from the source location to the destination location, the method further comprising providing the reward to the given courier after receiving the at least one of the portions from the mobile device of the given courier at the destination location.

3. The method of claim 2, wherein the reward is specified by at least one of the sender and the receiver, the method further comprising billing the at least one of the sender and the receiver once the data set has been received at the destination location and sent to the at least one recipient specified by the sender.

4. The method of claim 1, comprising transporting at least a first one of the plurality of portions from the source location to the destination location physically via the one or more couriers, and transporting at least a second one of the plurality of portions from the source location to the destination location digitally via one or more computer networks.

5. The method of claim 1, further comprising:
computing an estimated time and an estimated cost for transporting at least one of the plurality of portions physically via one or more couriers;
computing an estimated time and an estimated cost for transporting the at least one of the plurality of portions digitally via one or more computer networks; and
based on the estimated times and costs, determining whether to transport the at least one of the plurality of portions from the source location to the destination location digitally via one or more computer networks rather than physically via the one or more couriers.

6. The method of claim 5, further comprising:
computing the estimated cost for transporting the at least one of the plurality of portions physically via one or more couriers based at least in part on rewards offered to couriers for one or more previous transportation transactions; and
computing the estimated cost for transporting the at least one of the plurality of portions digitally via one or more computer networks based at least in part on at least one service contract with at least one provider of the one or more computer networks.

7. The method of claim 1, wherein finding the two or more couriers comprises determining that the two or more couriers are in the source location and will travel to the destination location.

8. The method of claim 1, wherein finding the two or more couriers comprises acquiring information that the two or more couriers are planning to travel from the source location to the destination location.

9. An apparatus for use in transporting a set of data from a source location to a destination location, the destination location being geographically remote from the source location, the apparatus comprising:
a memory; and
a processor, the processor being operative:
to receive the data set from at least one sender at the source location, the sender specifying at least one recipient at the destination location;
to receive a user selection of a maximum budget and a due date for transporting the set of data;
to split the data set into a plurality of portions;
to find, by analyzing travel information from a transportation provider, two or more couriers who will travel from the source location to the destination location to each carry at least one of the plurality of portions based on the maximum budget and the due date;
while at least a given courier is at the source location, to send at least one of the plurality of portions to a mobile device of at least the given courier;
once the given courier travels to the destination location, to receive the at least one of the portions from the mobile device of the given courier;
once the plurality of portions of the data set have been received at the destination location, to send the data set to the at least one recipient specified by the sender.

10. A method for transporting data from a source location to a destination location, the destination location being geographically remote from the source location, the method comprising:
providing, by a mobile device, travel information to a transportation provider indicating that the mobile device will transit from a source location to a destination location;
receiving and displaying, by the mobile device, a request to transport at least a portion of a set of data from the source location to the destination location, the request being based on the travel information;
after a user of the mobile device agrees to the request, downloading at least the portion of the data set onto the mobile device at the source location based on a user-selected maximum budget and due date for transporting the set of data;
transporting the mobile device from the source location to the destination location; and
after arriving at the destination location, uploading at least the portion of the data set from the mobile device at the destination location.

11. The method of claim 10, wherein the request specifies a reward for transporting at least the portion of the data, wherein the user agrees to the request based at least in part on the specified reward, and wherein the user receives the specified reward after uploading at least the portion of the data set at the destination location.

12. The method of claim 10, wherein transporting the mobile device from the source location to the destination location comprises the user travelling from the source location to the destination location with the mobile device.

13. The method of claim 12, wherein the request is responsive at least in part to the user planning to travel from the source location to the destination location.

14. The method of claim 13, wherein the user planning to travel comprises the user booking a trip from the source location to the destination location through the transportation provider, and wherein the request is responsive to information obtained from the transportation provider about the booked trip.

15. The method of claim 12, wherein the user travels from the source location to the destination location at least in part responsive to the request.

16. The method of claim 10, wherein a size of the at least portion of the data set is based on at least one of available storage on the mobile device and a preference of the user.

17. The method of claim 10, wherein the request is received and displayed while the user is at the source location.

18. The method of claim 10, wherein the user travels to the source location responsive to the request.

19. The method of claim 10, further comprising uploading the data upon detecting a Wi-Fi connection at the destination location.

20. The method of claim 10, further comprising displaying a notification to the user upon arrival at the destination location, and uploading the data upon obtaining user approval responsive to the notification.

* * * * *